(12) United States Patent
Agami et al.

(10) Patent No.: US 6,904,097 B2
(45) Date of Patent: Jun. 7, 2005

(54) METHOD AND APPARATUS FOR ADAPTIVE SIGNALING IN A QAM COMMUNICATION SYSTEM

(75) Inventors: Gregory Agami, Arlington Heights, IL (US); Robert John Corke, Glen Ellyn, IL (US); Ron Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 809 days.

(21) Appl. No.: 09/871,833

(22) Filed: Jun. 1, 2001

(65) Prior Publication Data

US 2002/0186778 A1 Dec. 12, 2002

(51) Int. Cl.$^7$ .............................. H04L 23/02; H04L 5/12
(52) U.S. Cl. ...................... 375/261; 375/219; 375/295; 375/262; 375/341
(58) Field of Search ........................ 714/704; 375/261, 375/219, 295, 262, 341

(56) References Cited

U.S. PATENT DOCUMENTS 6,084,883 A * 7/2000 Norrell et al. .............. 370/420

* cited by examiner

Primary Examiner—Mohammed Ghayour
Assistant Examiner—Juan A. Torres
(74) Attorney, Agent, or Firm—Steven A. May

(57) ABSTRACT

A method and apparatus to adaptively puncture bits within QAM modulated data symbols transmitted in a communication system in order to effect a signaling channel. The method and apparatus utilize inherent characteristics of a particular mapping scheme for the QAM constellation to selectively puncture particular bits within a data symbol with signaling information and predetermined binary values to selectively increase the log-likelihood ratio gains of those particular bits punctured with the signaling information. The log-likelihood ratios are used to obtain the signaling information and, thus, increasing the gain of the log-likelihood ratios affords greater reliability for the signaling information without increasing the required system resources.

36 Claims, 3 Drawing Sheets

FIG. 3

| BIT POSITION | DEPENDENCY ON OTHER BITS | LLR |
|---|---|---|
| BIT $b_0$ | NONE | $\pm 4D^2$ |
| BIT $b_1$ | NONE | $\pm 4D^2$ |
| BIT $b_2$ | BIT $b_0=1$ | $\pm 16D^2$ |
| | BIT $b_0=0$ | $\pm 4D^2$ |
| BIT $b_3$ | BIT $b_1=1$ | $\pm 16D^2$ |
| | BIT $b_1=0$ | $\pm 4D^2$ |
| BIT $b_4$ | BIT $b_2=1$, BIT $b_0=1$ | $\pm 64D^2$ |
| | BIT $b_2=1$, BIT $b_0=0$ | $\pm 36D^2$ |
| | BIT $b_2=0$, BIT $b_0=0$ | $\pm 16D^2$ |
| | BIT $b_2=0$, BIT $b_0=1$ | $\pm 4D^2$ |
| BIT $b_5$ | BIT $b_3=1$, BIT $b_1=1$ | $\pm 64D^2$ |
| | BIT $b_3=1$, BIT $b_1=0$ | $\pm 36D^2$ |
| | BIT $b_3=0$, BIT $b_1=0$ | $\pm 16D^2$ |
| | BIT $b_3=0$, BIT $b_1=1$ | $\pm 4D^2$ |

*FIG. 4*

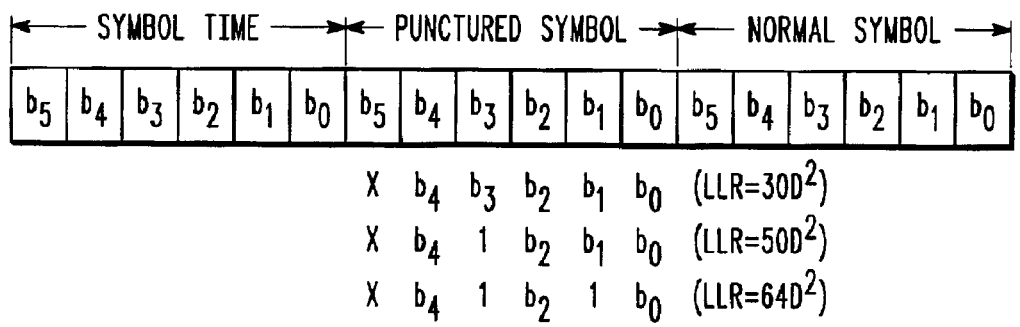

*FIG. 5*

METHOD AND APPARATUS FOR ADAPTIVE SIGNALING IN A QAM COMMUNICATION SYSTEM

FIELD OF THE INVENTION

The present invention relates generally to communications systems, and more particularly to providing signaling through puncturing data symbols in a quadrature amplitude modulation communication system.

BACKGROUND OF THE INVENTION

Various wireless communication systems are known in the art. In multiple access wireless communications systems, such as code division multiple access (CDMA), a base station transmits multiple signals to individual mobile stations. The base station transmits multiple signals on a forward link that typically includes separate data and signaling channels. Similarly, the mobile station transmits data and signaling via a reverse link to the base station.

Signaling channels used in the communications system are often used for tasks such as power control and for sharing system information such as data frame structures. The signaling channels transmit at a low rate and require minimal latency and high reliability since the information transmitted via these channels is used to control the communications system. High latency or erroneous data in the signaling channels may cause the communications system to become unstable, which severely degrades the system capacity. This degradation may be further exacerbated in a multiple access communication system that achieves high data rates through use of quadrature amplitude modulation (QAM) along with Turbo encoders and decoders.

As mentioned previously, signaling channels may be implemented using a separate dedicated channel, which has its own convolutional encoders and decoders. Separate dedicated channels, however, require system resources that may be costly and not readily available and diminish resources available to other channels. Additionally, the separate dedicated channels incur a convolutional decoder delay. In order to reduce signaling overhead and avoid signaling delay, another method of implementing a signaling channel is to puncture bits on top of existing high data rate data channels. However, signaling accomplished through puncturing on top of existing data channels can degrade the performance of the high data rate channel and can also suffer a loss of reliability because there is no coding gain in this method. In this instance, attempts to increase reliability have included repetition of signaling bits, which consumes even greater amounts of system resources.

Therefore, a need exists for signaling channels in a high data rate QAM communication system that have high reliability and low decode delay while utilizing minimal system resources.

BRIEF SUMMARY OF THE INVENTION

A method and apparatus is provided that adaptively punctures bits within QAM modulated data symbols transmitted in a communication system in order to effect a signaling channel. The method and apparatus utilize inherent characteristics of a particular mapping scheme for the QAM constellation to selectively puncture particular bits within a data symbol with signaling information and predetermined binary values to selectively increase the log-likelihood ratio gains of those particular bits punctured with the signaling information. The log-likelihood ratios are used to obtain the signaling information and, thus, increasing the gain of the log-likelihood ratios affords greater reliability for the signaling information without increasing the required system resources.

BRIEF DESCRIPTION OF THE DRAWINGS

FIG. 3 is an illustration of a Gray-coded Karnaugh mapped QAM constellation utilized by the QAM mapper of FIG. 2.

FIG. 4 is a table showing the correlation of log-likelihood ratio gain for each bit position in a data symbol based on values of other bits within the data symbol in accordance with an embodiment of the present invention.

FIG. 5 is an illustration of various puncturing schemes utilized for puncturing particular bits in a data symbol in accordance with embodiments of the present invention.

DETAILED DESCRIPTION OF THE INVENTION

To address the need for signaling channels in a high data rate QAM communication system that have high reliability and low decode delay while utilizing minimal system resources, a method and apparatus is provided that uses quadrature amplitude modulation (QAM) with bit-wise decoders where a log-likelihood ratio (LLR) is computed for each bit at a receiver portion. In particular, a transmitter in a communication system punctures bits of a data symbol that includes multiple data bits prior to modulation of the data symbol by a QAM mapper. The QAM mapper may employ a Gray-coded Karnaugh mapped constellation. In addition, the transmitter employs adaptive puncturing wherein specific bits within a data symbol are selectively punctured to achieve higher LLR gains that result from characteristics of the Karnaugh mapping scheme. The increased LLR gain affords higher reliability for signaling without consuming additional system resources.

Figure 1:
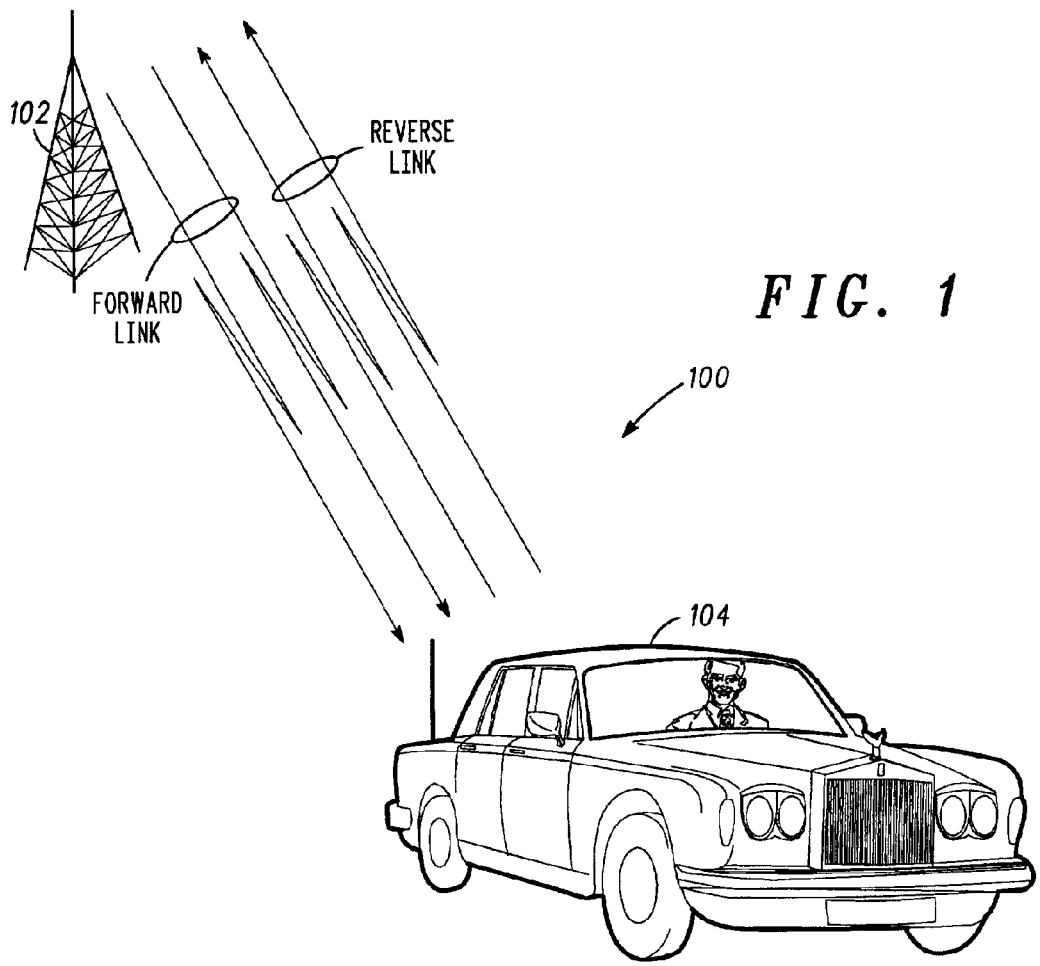
FIG. 1 is an illustration of an exemplary wireless communication system in accordance with an embodiment of the present invention.

The present invention can be better understood with reference to FIGS. 1–5. FIG. 1 illustrates an exemplary communications system 100 in accordance with an embodiment of the present invention. Communications system 100 includes a base station 102 that is capable of transmitting multiple signals to each of multiple mobile subscriber units (MSs) 104 (one shown), such as cellular telephones, radiotelephones, or wireless data modems. Base station 102 transmits multiple signals on a forward link that includes data and signaling channels. Similarly, MS 104 transmits data and signaling via a reverse link to the base station 102.

Figure 2:
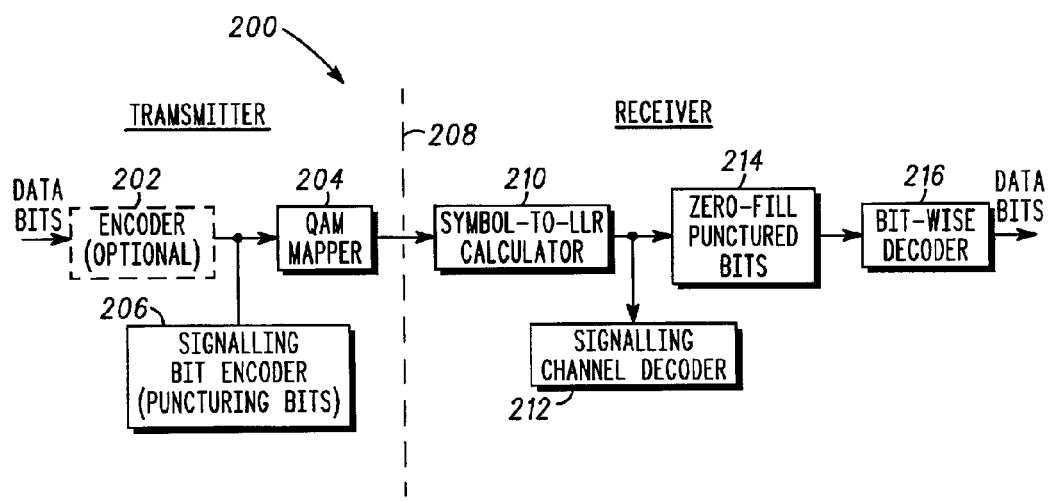
FIG. 2 is a block diagram of communications system architecture in accordance with an embodiment of the present invention.

FIG. 2 is a block diagram of an architecture of a communications system 200, such as communications system 100, that implements the signaling channel by adaptively puncturing signaling bits into a data symbol. Communications system 200 includes a transmitter (indicated by bracket), such as base station 102. Communications system 200 further includes a receiver (indicated by bracket), such as MS 104, on the other side of a transmission interface 208 that receives transmitted data symbols and that extracts the signaling bits from the punctured data symbols after the computation of a log-likelihood ratio (LLR) for each bit of a received data symbol. However, those who are of ordinary skill in the art realize that base station 102 and MS 104 are each capable of operating as either a transmitter or a receiver with respect to the embodiments of the present invention.

On the transmitter side of communications system 200, a stream of data, preferably in a binary format such as bits, is input to an encoder 202. Encoder 202 encodes the data stream pursuant to a prescribed data coding scheme and routes the encoded data to a QAM mapper 204. The type of encoder is not critical to, nor is specific encoding necessary for, the present invention. In another embodiment of the present invention, the data stream may be entered directly to QAM mapper 204. In either case, prior to inputting the data stream to QAM mapper 204, signaling data (i.e., signaling bits) is punctured into the data stream by a signal bit encoder 206 according to a predetermined puncturing scheme, which puncturing scheme is described in greater detail below.

QAM mapper 204 maps the input data stream to points in a multi-dimensional constellation. In order to map the data stream, QAM mapper 204 groups the input data stream into multiple groups of P bits, that is, into multiple P-tuples wherein each P-tuple may be thought of as a data symbol. QAM mapper 204 modulates each of the multiple P-tuples, or data symbols, by mapping the P-tuple to a corresponding point out of M possible points in a predetermined M-ary QAM constellation, wherein $M=2^P$. To this end, the predetermined QAM constellation that includes the M possible points is defined within a multi-dimensional space, preferably a complex two-dimensional (I/Q) space. Each point within the two-dimensional space may be thought of as a vector sum of two scaled basis vectors. The two scaled basis vectors respectively correspond to an in-phase (I), or a real (r), component and a quadrature (Q), or an imaginary (i), component of the constellation point, or corresponding data symbol. The respective amplitudes of the two basis vectors used to define a particular point may be thought of as two-dimensional coordinates of the point.

Preferably the mapping scheme employed by QAM mapper 204 includes a Gray-coded Karnaugh mapping scheme, which is utilized to effect the predetermined puncturing scheme of the present application and simplifies hardware mapping and slicing functions. However, those who are of ordinary skill in the art realize that other QAM mapping schemes may be used herein without departing from the spirit and scope of the present invention. After modulation of each data symbol by QAM mapper 204, the modulated data symbols are transmitted via a communication interface 208 to the receiver. Communication interface 208 is preferably wireless radio frequency (RF) transmission interface, but could also be any other transmission interface means such as land lines.

At the receiver of communications system 200, a Symbol-to-LLR calculator 210 receives each modulated data symbol and demodulates the modulated data symbol based on a determined log-likelihood ration (LLR) for each bit of the multiple bits corresponding to the modulated data symbol. Symbol-to-LLR calculator 210 determines an LLR for each bit based on a predetermined algorithm that is discussed in greater detail below. The demodulated data symbol is then output from Symbol-to-LLR calculator 210 to both a zero-fill block 214 and a signaling channel decoder 212. When a data symbol has been punctured, zero-fill block 214 fills punctured bit locations in the data symbol with a soft value of zero corresponding to an equal likelihood of a bit value of a "0" or a "1". Each demodulated data symbol is then decoded by a bit-wise decoder 216 to recover the data bits encoded by encoder 202.

Figure 3:
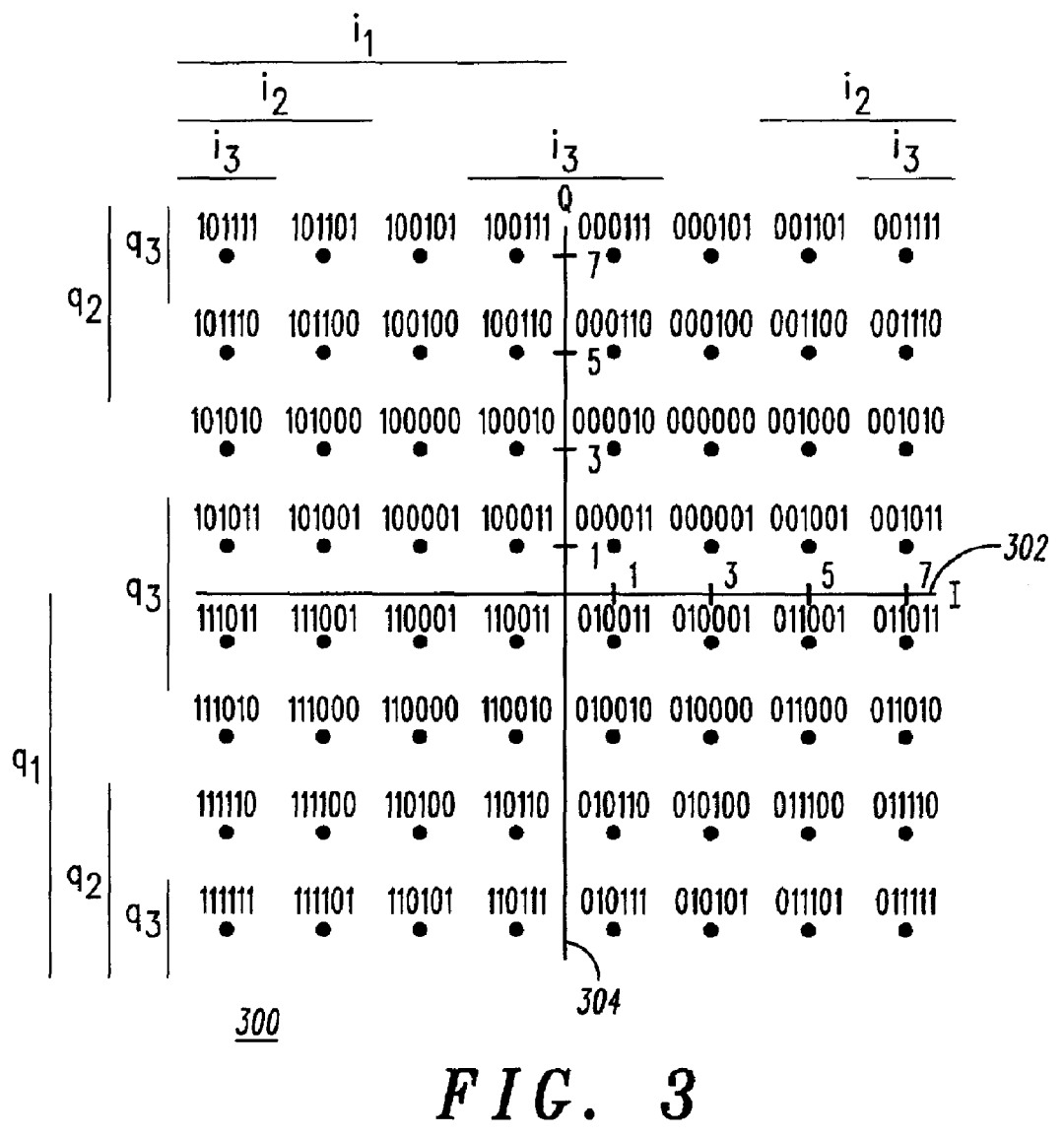

FIG. 3 is an illustration of an exemplary QAM constellation 300 in accordance with an embodiment of the present invention. QAM constellation 300 preferably comprises a Gray-coded Karnaugh constellation; however, mapping schemes other than Karnaugh mapping may also be used herein without departing from the spirit and scope of the present invention. QAM constellation 300 is a 64-QAM square constellation (i.e., M=64) wherein each of the 64 constellation points corresponds to a particular P-tuple, or data symbol, of 6 bits (i.e., P=6). However, those of ordinary skill in the art realize that any square Karnaugh mapped constellation for an M-ary QAM system may be used herein without departing from the spirit and scope of the present invention. Each P-tuple, or 6-bit sequence, is of the form "$i_1 q_1 i_2 q_2 i_3 q_3$", labeled from the most significant bit to least significant bit. Each "i" bit is independent of the imaginary, or quadrature (Q), axis 304 and each "q" bit is independent of the real, or in-phase (I), axis 302.

For example, for any given point in QAM constellation 300, movement to other points in a direction that is parallel to I-axis 302 produces a change in one or more "i" bits in the corresponding 6-bit sequence but does not produce a change in any of the "q" bits. As another example of this independence, for each point included in the first column of points to the right of Q-axis 304, bit $i_1$ in each corresponding data symbol is "0", bit $i_2$ in each corresponding data symbol is "0", and bit $i_3$ in each corresponding data symbol is "1". As a further illustration of this property of the Karnaugh mapped QAM data symbols, the lines shown at the top of, and to the left of, constellation 300 indicate subsets of constellation points where an indicated bit of a corresponding data symbol is a "1", and an absence of a line indicates of a subset of constellation points where an indicated bit of a corresponding data symbol is a "0". For example, the subset of points in constellation 300 wherein the bit $i_1$ of a corresponding data symbol is a "1" lies in the left hand side of the I/Q plane whereas the subset of points wherein the bit $i_1$ of a corresponding data symbol is a "0" lies in the right hand side of the I/Q plane.

Symbol-to-LLR calculator 210 determines an LLR for each of the bits within a data symbol to determine whether the bit is more likely to be a "0" or a "1". For a received data symbol y received at time k (i.e., $y_k$), the LLR of a j-th bit of the received symbol is determined by the following relationship:

$$LLR(u_{k,j}) = \log\left\{\frac{P(u_{k,j} = 0 \mid y_k)}{P(u_{k,j} = 1 \mid y_k)}\right\} \quad (1)$$

where "$u_{k,j}$" corresponds to a hypothesized j-th bit of the transmitted data symbol based on the received symbol $y_k$, "$P(u_{k,j}=0|y_k)$" corresponds to a probability that the hypothesized j-th bit is a value "0" given the received data symbol $y_k$, and "$P(u_{k,j}=1|y_k)$" corresponds to a probability that the hypothesized j-th bit is a value "1" given the received data symbol $y_k$.

Equation (1) reduces to the expression:

$$LLR(u_{k,j}) = \log\left\{\frac{\sum_{u_k : u_{k,j}=0} P(y_k \mid u_k)}{\sum_{u_k : u_{k,j}=1} P(y_k \mid u_k)}\right\} \quad (2)$$

where it is assumed that all transmitted data symbols are equiprobable. The probability "P" can then be represented by the following relationship:

$$P(y_k|u_k) = p(y_k^r, y_k^i | u_k^r, u_k^i) = p(y_k^r | u_k^r) p(y_k^i | u_k^i) \quad (3)$$

where "r" corresponds to the real component, and "i" corresponds to the imaginary component, of each of a data symbol $u_k$, selected as described below, and the received data symbol $y_k$, and where perfect channel correction is assumed such that the real component is independent of the imaginary component.

Assuming additive Gaussian noise, the equation (3) can be rewritten as the following expression:

$$P(y_k | u_k) = \frac{1}{2\pi\sigma^2} \exp - \frac{D_k^2}{2\sigma^2} \quad (4)$$

where the parameter $D_k^2$ is the squared Euclidean distance in the complex I/Q plane between a point corresponding to the received data symbol $y_k$ and a data symbol, that is, $u_k$, corresponding to one of the M points in the QAM constellation, such as constellation 300, selected as described below. It should be noted that the point in the complex I/Q plane corresponding to received data symbol $y_k$ is unlikely to be one of the M points in the QAM constellation. The parameter $\sigma^2$ is the variance of the Gaussian noise.

With respect to each bit of the received data symbol $y_k$, two points and corresponding data symbols $u_k$ are selected as follows from the QAM constellation of M points. A first point corresponds to the data symbol $u_k$ whose j-th bit, that is, $u_{k,j}$, is a value "0", and which point, out of all of the constellation points whose j-th bit is a "0", is nearest to the point corresponding to $y_k$. A second point corresponds to the data symbol $u_k$ whose j-th bit, that is, $u_{k,j}$, is a value "1", and which point, out of all of the constellation points whose j-th bit is a "1", is nearest to the point corresponding to $y_k$.

For each constellation point and corresponding data symbol selected as described above, a squared Euclidean distance $D_k^2$ between the point and a point corresponding to the received data symbol $y_k$ can be calculated by summing the squares of the differences between the real (r) components, and between the imaginary (i) components, of the points, as represented by the following relationship:

$$D_k^2 = |y_k - u_k|^2 = (y_k^r - u_k^r)^2 + (y_k^i - u_k^i)^2 \quad (5)$$

Substituting equation (4) into equation (2) allows calculation of the LLR based on the squared Euclidean distances and yields the following expression:

$$LLR(u_{k,j}) = \log \sum_{u_k : u_{k,j}=0} e^{-\frac{D_k^2}{2\sigma^2}} - \log \sum_{u_k : u_{k,j}=1} e^{-\frac{D_k^2}{2\sigma^2}} \quad (6)$$

Equation (6) may then be approximated by simply taking the difference between the minimum squared distances between the received data symbol $y_k$ and each of the two selected data symbols $u_k$, having respective j-th bit values of "1" and "0". That is, equation (6) may be reduced to the following expression to approximate the LLR:

$$LLR(u_{k,j}) = \min_{u_k : u_{k,j}=1} [D_k^2] - \min_{u_k : u_{k,j}=0} [D_k^2] \quad (7)$$

By employing equation (7), the receiver of communication system 200 can determine an LLR with respect to the j-th bit of the received data symbol. Based on the LLR, the receiver can then determine a value of the j-th bit of the transmitted data symbol, thereby recovering the transmitted data symbol based on the received data symbol. The process of determining an LLR for the j-th bit of the received data symbol may be summarized in the following steps:

a) determining a first minimum squared Euclidean distance between the point corresponding to the received data symbol $y_k$ and a nearest constellation point whose j-th bit, that is, $u_{k,j}$, is a value "1", b) determining a second minimum squared Euclidean distance between the point corresponding to the received data symbol $y_k$ and a nearest constellation point whose j-th bit, that is, $u_{k,j}$, is a "0", and c) determining a difference between the first minimum squared Euclidean distance and the second minimum squared Euclidean distance.

If the difference is positive, then the j-th bit of the transmitted data symbol is most likely a binary value of "0". If the difference is negative, then the j-th bit is most likely a binary value of "1". These computed LLR values can, in turn, be fed into a convolutional decoder or a Turbo decoder, for example, that then determines the most likely sequence of bits. As an alternative, a simple slicer may be used to decode each bit by simply taking the sign of the LLR.

Several properties of the particular LLRs computed arise from using a Karnaugh-mapped construction of a QAM constellation, such as QAM constellation 300. For example, when a 6-bit data symbol is being mapped to a point in the QAM constellation, the LLRs of the even bits (i.e., $q_1$, $q_2$, and $q_3$) are independent from the LLRs of the odd bits (i.e., $i_1$, $i_2$, or $i_3$). Hence, whether the value of an odd bit "i" is a "1" or "0", it has no effect on the LLR of an even bit "q", and vice versa. Furthermore, the odd bits (i.e., $i_1$, $i_2$, or $i_3$) normally determine a position in the I-axis direction, which has no effect on the LLR for any even bit $q_1$, $q_2$, or $q_3$ since all of the even bits "q" at a particular location in the Q-axis direction will have the same bit value irrespective of where the data symbol lies along the I-axis. It is noted, however, the value of the odd bit or even bit can effect the LLR for the other odd or even bits, respectively.

Another feature that arises from utilizing a Karnaugh-mapped QAM constellation is that the two most significant bits (i.e., $i_1$ and $q_1$) have a higher average LLR than the lesser significant bits (i.e., $i_2$ and $q_2$). These middle bits, in turn, have a higher average LLR than the two least significant bits (i.e., $i_3$ and $q_3$). The reason for the differing average LLRs from the most significant to the least significant bits is due to the fact that the most significant bits $i_1$ and $q_1$ have the largest continuous coverage in the Karnaugh map (e.g., four columns or rows of points, or corresponding data symbols, as are seen in FIG. 3), whereas lesser significant bits $i_2$ and $q_2$ for example, have lesser coverage (e.g., two rows or columns of points or corresponding data symbols). The least significant bits $i_3$ and $q_3$ have the least coverage in the Karnaugh map given a data symbol having particular values of the most significant and lesser significant bits, wherein the coverage is only one row or column of points or corresponding data symbols. Thus, the least significant bits $i_3$ and $q_3$ will always have an LLR associated with the distance of one point or corresponding data symbol. Similarly the lesser significant bits $i_2$ and $q_2$ will have LLRs associated with distances of one or two data symbols and the most significant bits $i_1$ and $q_1$ will have LLRs associated with distances of 1, 2, 3 or 4 points or corresponding data symbols.

The above-described properties of a Karnaugh mapped QAM constellation can be utilized to implement an adaptive puncturing scheme to transmit signaling information via a punctured data symbol in a simple and efficient manner. That is, bits selected to be punctured with signaling information may be chosen to yield the highest LLR or, alternatively, a minimally acceptable LLR gain that will effect a requisite level of reliability for transmitting the signaling information. The greater the value of the LLR, the greater a level of noise that is required to cause a bit error. Hence, higher LLRs are more immune to noise introduced during transmission of the data symbols.

FIG. 4 illustrates a table of LLR gains of bit positions and values for the Karnaugh mapped, Gray-coded constellation of FIG. 3 assuming a noiseless environment. For purposes of clarity and assuming a 64-QAM system as an example, the 6 bits in a data symbol having the bit sequence "$i_1$ $q_1$ $i_2$ $q_2$ $i_3$ $q_3$" are hereinafter referred to as corresponding sequential bit positions "$b_5$ $b_4$ $b_3$ $b_2$ $b_1$ $b_0$". Thus, for bit positions $b_0$ and $b_1$, which are the least significant bits, the table in FIG. 4 illustrates that the values of these bits do not affect the magnitude of the LLR for these bits. However, the values of bit positions $b_0$ and $b_1$ affect the LLRs of the other bits in the data symbol. Thus, if these bits are punctured, a resultant gain in magnitude of the LLRs of the other bits occurs. For instance, when bit $b_0$ is a "0" the resultant LLR for bit $b_2$ is a minimal value of $+/-4$ $D^2$. However, when bit $b_0$ is a "1" the resultant magnitude for bit $b_2$ increases to $+/-16$ $D^2$. Similarly for odd bit $b_3$ the LLR depends on the value of odd bit $b_1$.

For the most significant bit positions $b_4$ and $b_5$, various combinations of values of the least significant and lesser significant bits yield varying effects on the LLRs of the most significant bits. As may be seen in the table of FIG. 4, when both the lesser and least significant bits are of value "1" the most significant gain in the LLR is effected whereas when the lesser significant bit has a value of zero and the least significant bit has a value of one (i.e., a bit combination resulting in a data symbol that corresponds to a constellation point that is closest to an axis), the LLR magnitude is at the minimal value of $+/-4$ $D^2$.

Based on the known LLR values corresponding to particular combinations of bits in the data symbol, a data symbol having particular bit values may be punctured in order to achieve a desired LLR and a desired level of reliability for the signaling bits punctured within the symbol. Therefore, a data symbol may be punctured periodically at a known time such that the receiver is aware of where the punctured bits are located. For example, of the 6 bits comprising a transmitted data symbol that is modulated based on a 64-QAM system, one of the most significant bits (e.g., $b_5$) is punctured since the most significant bits inherently have average LLRs superior to the lower four bits in the data symbol as was illustrated in the table of FIG. 4. By simply puncturing the most significant bit, a resultant average LLR magnitude of 30 $D^2$ is achieved, which is superior to the average LLR magnitude of 14.67 $D^2$ for all bits and corresponds to a 6.2 dB gain. FIG. 5 illustrates three possible bit sequences for a punctured data symbol where "X" indicates the punctured signaling bit that carries the signaling information (i.e., the signaling channel). In the first case, most significant odd bit $b_5$ is shown punctured without regard to the values of the other odd bits $b_3$ and $b_1$. As discussed previously, this results in an average LLR magnitude of 30 $D^2$ (i.e., the average of the four LLR values corresponding to the four possible combinations of bits $b_3$ and $b_1$).

If a higher degree of reliability is required for the signaling channel the bit $b_3$ may be punctured with a binary value of "1" as indicated in the second sequence of FIG. 5, which will raise the average LLR magnitude for the signaling bit (i.e., $b_5$) to 50 $D^2$ (i.e., the average of the LLR values 64 $D^2$ and 36 $D^2$ for the two possibilities where bit $b_1$ is a "1" or a "0"). The increase in the LLR magnitude to an average of 50 $D^2$ corresponds to a 10.6 dB gain. Similarly, in order to achieve the highest degree of reliability possible for the 64-QAM system illustrated, both odd bits $b_3$ and $b_1$ may be punctured with a binary value of "1" as shown t he third sequence illustrated in FIG. 5. This will result in raising the average LLR magnitude to 64 $D^2$ for signaling bit $b_5$, which corresponds to a 12.8 dB gain.

It is noted that the bit sequence described above is an arbitrary sequence and that other bit sequences, as well as other QAM mapping schemes, may be employed herein without departing from the spirit and scope of the present invention. For example, a mapping where the least significant bits in a data symbol correspond to the largest area of coverage on the mapping constellation could be used. In this case, the least significant bit positions in the data symbol could be selectively punctured with signaling information since these positions would inherently have the highest LLRs due to their coverage of the constellation. Further, the lesser significant and most significant bits could be punctured to yield gains in the LLRs of the least significant bits correlative to the puncturing of lesser and least significant bit positions of the Karnaugh mapped system described previously. Other mappings where other lesser significant bits or combinations of most, lesser or least significant bits represent the highest area of constellation coverage may also be envisioned.

Based on the foregoing, the degree of reliability for the signaling channel can be selectively set, dependent on the adaptive puncturing of particular bits in a data symbol and the number of those bits actually punctured. To achieve higher signaling reliability, those bit positions having the highest LLRs given a particular mapping scheme (e.g., those bit positions in a data symbol having the greatest constellation area coverage) can be chosen for puncturing with signaling information. However, the more bits punctured results in greater degradation to the high data rate QAM channel. Nonetheless, convolutional or Turbo encoding of the high data rate information is capable of protecting the information data bits against single-bit puncturing such that degradation is minimal. Additionally, the signaling bits themselves are easily decoded by signaling channel decoder 212 without incurring any Turbo or convolutional decoder delay.

In operation, the system of FIG. 2 effects a signaling channel by first determining a desired reliability level (i.e., the desired number of bits to be punctured in a data symbol). This selection, however, need not be static, but may be varied continuously dependent on the level of noise present in the system. Signaling bit encoder 206 selects particular data symbols to puncture periodically based on a predetermined time or any other criterion. Irrespective of the methodology for deciding which data symbol or symbols of multiple data symbols are punctured, information concerning which data symbols are punctured is common to both the transmitter and receiver such that the receiver knows which data symbols it receives are punctured with signaling channel information. Preferably, the actual signaling information is contained in most significant bit $b_5$ and the selective reliability of the signaling channel is set by puncturing either bit $b_3$ or bits $b_3$ and $b_1$, but may be different for other alternate mapping schemes and symbol sequences. Once a data symbol is punctured by the signaling bit encoder 206, the punctured data symbol, along with non-punctured data symbols, are modulated by QAM mapper 204 according to the predetermined mapping scheme. Preferably this mapping scheme is a Gray-coded Karnaugh map as exemplified in FIG. 3. The modulated data symbols are then transmitted by an interface 208, such as a wireless interface, to a receiver.

Modulated data symbols are received by the receiver and are input to Symbol-to-LLR calculator 210. Symbol-to-LLR calculator 210 determines, for each bit of each received data symbol, the minimum squared Euclidean distance between a point in the complex plane corresponding to the received data symbol and each of a constellation point corresponding to a data symbol where the value of the bit is a "1" and a constellation point corresponding to a data symbol where the value of the bit is a "0". The difference of these minimum squared Euclidean distances yields the LLR. When a punctured data symbol is output by Symbol-to-LLR calculator 210 that is known by the receiver to be punctured according to the predetermined puncturing scheme, signaling channel decoder 212 simply reads the value of the computed LLR for the punctured bit (here bit $b_5$). If the LLR for the punctured is positive then the signaling bit is decoded as a "0", for example. Conversely, if the LLR is negative then the signaling bit is decoded as a "1". It is noted that this could be alternatively be the opposite of the foregoing, dependent on the particular mapping scheme utilized. The punctured symbol is then input to zero-fill punctured bits inserter 214, which replaces the punctured bits within the punctured data symbol with a soft value of zero corresponding to an equal likelihood of a bit value of a "1" or a "0". The LLR values are then delivered to bit-wise decoder 216 that employs convolutional decoding, Turbo decoding or any other known decoding methodology known in the art to recover the data bits.

The puncturing scheme according to the teachings of the present invention may be applied to any other M-ary square constellation where M is an integer power of 2 and is also greater than 4. As noted previously, the constellation for the QAM mapping may employ some form of Karnaugh mapping as that illustrated in FIG. 3 but need not be identical to this mapping or may also employ a mapping that is not Karnaugh mapping or Gray-coded. With other M-ary square constellation QAM systems, the bit location or locations having the highest LLRs may be punctured with the signaling channel data. In addition, other bits that are known to affect the LLR of the bit locations having the highest LLRs may be punctured with particular binary values in order to obtain higher degrees of LLR gain.

The above teachings of the present invention may be utilized in any multiple-access communication system employing QAM with bit-wise decoders and a low data rate channel for signaling purposes. Use of the bit puncturing scheme according to the teachings of the present invention affords reliability and reduces latency for signaling bits in high data rate channels. Adaptive puncturing according to the teachings of the present application affords also a simple solution that may be easily implemented in hardware and affords flexibility to adjust the reliability to support the minimum quality of service required. It will be further apparent to those skilled in the art that other embodiments other than the specific disclosed embodiments described above may be devised without departing from the fair scope of the appended claims and their equivalents.

What is claimed is:

1. An apparatus for providing adaptive signaling in a communication system, the apparatus having a transmitter comprising:
    a signaling bit encoder configured to selectively puncture, based on a log-likelihood ratio, one or more bits of a data symbol comprised of a plurality of bits with at least one signaling bit representing signaling information to achieve a punctured data symbol; and
    a mapper configured to modulate the punctured data symbol according to a predetermined mapping scheme having predetermined characteristics, the transmitter configured to transmit the modulated punctured data symbol.

2. The apparatus according to claim 1, wherein the transmitter selectively punctures one or more bits of the data symbol with the at least one signaling bit that have a highest inherent log-likelihood ratio among all bits in the data symbol.

3. The apparatus according to claim 1, wherein the predetermined mapping scheme comprises an M-ary Quadrature Amplitude Mapping using a square Karnaugh mapped constellation.

4. The apparatus according to claim 1, wherein the predetermined mapping scheme comprises Gray-coding.

5. The apparatus according to claim 1, wherein each of the data symbols has a prescribed number of odd and even bits.

6. The apparatus according to claim 5, wherein the signaling bit encoder selectively punctures a most significant odd bit position of a data symbol with the at least one signaling bit and adaptively punctures one of one or more lesser significant odd bits in the data symbol or a combination of lesser significant odd bits and a least significant odd bit with predetermined bit values to achieve a prescribed log-likelihood ratio gain for the most significant odd bit position.

7. The apparatus according to claim 5, wherein the signaling bit encoder selectively punctures a most significant even bit position of a data symbol with the at least one signaling bit and adaptively punctures one of one or more lesser significant even bits in the data symbol or a combination of lesser significant even bits and a least significant even bit with predetermined bit values to achieve a prescribed log-likelihood ratio gain for the most significant even bit position.

8. The apparatus according to claim 5, wherein the predetermined characteristics include independence of odd bits in a data symbol from even bits in the data symbol such that the log-likelihood ratio calculated for each of the even bits in the data symbol are only affected by values of other even bits in the data symbol and the log-likelihood ratio calculated for each of the odd bits in the data symbol are only affected by values of other odd bits in the data symbol.

9. The apparatus according to claim 1, further comprising a receiver that is configured to receive transmitted punctured data symbols and calculate a log-likelihood ratio for each bit of the received punctured data symbols and having a decoder configured to extract the signaling information from the at least one signaling bit in the punctured data symbol.

10. The apparatus according to claim 9, wherein the decoder in the receiver is configured to extract signaling information within the punctured bit by determining a sign of the log-likelihood ratio calculated for a bit location into which the at least one signaling bit has been punctured.

11. The apparatus according to claim 10, wherein the decoder assigns the at least one signaling bit a first binary value of when the sign of the calculated log-likelihood ratio is negative and assigns the at least one signaling bit a second binary value when the sign of the calculated log-likelihood ratio is positive.

12. A receiver configured for receiving, decoding and demodulating a data symbol encoded by a transmitter, which transmitter selectively punctures one or more bit locations of the data symbol comprised of a plurality of bits with at least one signaling bit representing signaling information to achieve a punctured data symbol and modulates the punctured data symbol according to a predetermined mapping scheme having predetermined characteristics, the transmitter configured to transmit the modulated punctured data symbol to the receiver, wherein the receiver comprises:

a symbol-to-log-likelihood ratio calculator configured to receive the transmitted punctured data symbol and calculate a log-likelihood ratio for each bit of the received punctured data symbol; and a signaling channel decoder configured to extract the signaling information from the at least one signaling bit in the punctured data symbol based on the calculated log-likelihood ratio of the at least one signaling bit.

13. The receiver according to claim 12, wherein the one or more bits of the data symbol punctured by the transmitter with the at least one signaling bit have a highest inherent log-likelihood ratio among all bits within the data symbol.

14. The receiver according to claim 12, wherein the predetermined mapping scheme comprises an M-ary Quadrature Amplitude Mapping scheme using a square Karnaugh mapped constellation.

15. The receiver according to claim 12, wherein the predetermined mapping scheme used by the transmitter comprises Gray-coding.

16. The receiver according to claim 12, wherein the signaling channel decoder is configured to extract signaling information within the punctured bit by determining a sign of the log-likelihood ratio calculated by the symbol-to-log-likelihood ratio calculator for a bit location into which the at least one signaling bit has been punctured.

17. The receiver according to claim 16, wherein the signaling channel decoder assigns the at least one signaling bit a first binary value when the sign of the calculated log-likelihood ratio is negative and assigns the at least one signaling bit a second binary value when the sign of the calculated log-likelihood ratio is positive.

18. The receiver according to claim 12, further comprising a zero-fill inserter receiving an output of the symbol-to-log-likelihood calculator and configured to insert a soft value of zero into data symbol bit locations punctured by the transmitter.

19. The receiver according to claim 12, further comprising a bit-wise decoder configured to convert log-likelihood ratios output by the symbol-to-log-likelihood calculator into binary data bits.

20. A method for providing signaling in a communication system comprising steps of:

puncturing one or more particular bits of a data symbol comprised of a plurality of bits with at least one signaling bit representing signaling information to achieve a punctured data symbol, wherein the puncturing is based on a log-likelihood ratio;

modulating the punctured data symbol according to a predetermined mapping scheme having predetermined characteristics; and transmitting the modulated punctured data symbol.

21. The method according to claim 20, wherein bit locations within a data symbol that have a highest inherent log-likelihood ratio are punctured with the signaling information.

22. The method according to claim 20, wherein the predetermined mapping scheme comprises an M-ary Quadrature Amplitude Mapping using a square Karnaugh mapped constellation.

23. The method according to claim 20, wherein the predetermined mapping scheme comprises Gray-coding.

24. The method according to claim 20, wherein each of the data symbols have a prescribed number of odd and even bits.

25. The method according to claim 24, wherein a most significant odd bit position of a data symbol is selectively punctured with the at least one signaling bit and one of one or more lesser significant odd bits in the data symbol or a combination of lesser significant odd bits and a least significant odd bit with predetermined bit values are adaptively punctured to achieve a prescribed log-likelihood ratio gain for the most significant odd bit position.

26. The method according to claim 24, wherein a most significant even bit position of a data symbol is selectively punctured with the at least one signaling bit and one of one or more lesser significant even bits in the data symbol or a combination of lesser significant even bits and a least significant even bit with predetermined bit values are adaptively punctured to achieve a prescribed log-likelihood ratio gain for the most significant even bit position.

27. The method according to claim 24, wherein the predetermined characteristics include independence of odd bits in the data symbol from even bits in the data symbol such that a log-likelihood ratio calculated for each of the even bits in the data symbol are only affected by values of other even bits in the data symbol and a log-likelihood ratio calculated for each of the odd bits in the data symbol are only affected by values of other odd bits in the data symbol.

28. The method according to claim 20, further comprising steps of:

receiving and demodulating the transmitted data symbol by determining the log-likelihood ratio for each bit of the punctured data symbol based on the predetermined mapping scheme; and decoding the signaling bits within the demodulated punctured data symbol.

29. The method according to claim 28, wherein signaling information within the punctured bit is extracted by determining a sign of the log-likelihood ratio calculated for a bit location into which the at least one signaling bit has been punctured.

30. The method according to claim 29, wherein the at least one signaling bit is assigned a first binary value when the sign of the calculated log-likelihood ratio is negative and the at least one signaling bit is assigned a second binary value when the sign of the calculated log-likelihood ratio is positive.

31. A method for receiving data, wherein one or more particular bits of a data symbol comprised of a plurality of bits are punctured with one or more signaling bits representing signaling information to achieve a punctured data symbol, wherein the punctured data symbol is modulated according to a predetermined mapping scheme having predetermined characteristics to produce a modulated data symbol, and wherein the method comprises steps of:

receiving the modulated data symbol;

demodulating the modulated data symbol by calculating the log-likelihood ratio for each bit of the punctured data symbol based on the predetermined mapping scheme; and decoding the signaling bits within the demodulated data symbol.

32. The method according to claim 31, wherein bit locations within a data symbol that have the highest inherent log-likelihood ratio are punctured with the signaling information.

33. The method according to claim 31, wherein the predetermined mapping scheme comprises an M-ary Quadrature Amplitude Mapping using a square Karnaugh mapped constellation.

34. The method according to claim 31, wherein the predetermined mapping scheme comprises Gray-coding.

35. The method according to claim 31, wherein signaling information within the punctured bit is extracted by determining a sign of the log-likelihood ratio calculated for a bit location into which the at least one signaling bit has been punctured.

36. The method according to claim 35, wherein the at least one signaling bit is assigned a first binary value when the sign of the calculated log-likelihood ratio is negative and the at least one signaling bit is assigned a second binary value when the sign of the calculated log-likelihood ratio is positive.

* * * * *